United States Patent
Aufderheide et al.

(10) Patent No.: US 6,860,503 B2
(45) Date of Patent: Mar. 1, 2005

(54) RETRACTILE MOTOR-VEHICLE TRAILER HITCH

(75) Inventors: Reinhold Aufderheide, Rietberg (DE); Friedrich Domke, Herzebrock-Clarholz (DE); Alexander Giesbrecht, Ennigerloh (DE); Gerhard Hermbusch, Langenberg (DE); Andreas Mersch, Rheda-Wiedenbrück (DE); Jürgen Peitz, Rheda-Wiedenbrück (DE); Dirk Vahle, Ennigerloh (DE); Burkhard Weniger, Welver-Berwicke (DE); Martin Wyrwich, Rheda-Wiedenbrück (DE)

(73) Assignee: Westfalia-Automotive GmbH & Co. KG, Rheda-Wiedenbruck (DE)

( * ) Notice: Subject to any disclaimer, the term of this patent is extended or adjusted under 35 U.S.C. 154(b) by 0 days.

(21) Appl. No.: 10/712,311

(22) Filed: Nov. 12, 2003

(65) Prior Publication Data

US 2004/0113391 A1 Jun. 17, 2004

(30) Foreign Application Priority Data

Nov. 13, 2002 (DE) .......................... 102 52 722
May 7, 2003 (DE) .......................... 103 20 302

(51) Int. Cl.$^7$ ................................ B60D 1/06
(52) U.S. Cl. ................... 280/491.3; 280/491.1; 280/511
(58) Field of Search .................... 280/491.1–491.3, 280/495, 502, 504, 505

(56) References Cited

U.S. PATENT DOCUMENTS

| 4,923,205 | A | * | 5/1990 | Durm | 280/491.3 |
| 5,853,186 | A | * | 12/1998 | Gentner et al. | 280/491.3 |
| 6,402,178 | B1 | * | 6/2002 | Ifflaender | 280/491.3 |
| 6,409,201 | B1 | * | 6/2002 | Riehle | 280/491.1 |
| 6,547,271 | B2 | * | 4/2003 | Kleb et al. | 280/491.3 |

FOREIGN PATENT DOCUMENTS

| DE | 94 08 478 | 8/1994 |
| DE | 198 59 961 | 7/2000 |

* cited by examiner

Primary Examiner—Lesley D. Morris
Assistant Examiner—L. Lum
(74) Attorney, Agent, or Firm—Herbert Dubno; Andrew Wilford

(57) ABSTRACT

A retractile trailer hitch has a tube shaft fixed on a motor-vehicle frame and an arm having a tubular inner end pivotal on the shaft and an outer ball end. The arm is limitedly axially displaceable on the shaft between locked and unlocked positions. Formations on the frame and on the inner end angularly arrest the arm in its end positions in the locked position of the inner end. The formations are unengageable with each other in the unlocked position of the inner end. A bolt is axially displaceable inside the shaft between a holding position and a freeing position. Balls inside the inner end are coupled to the bolt for axially displacing the arm into the locked position on displacement of the bolt into the holding position and for displacing the arm axially into the unlocked position on displacement of the bolt into the freeing position.

20 Claims, 6 Drawing Sheets

RETRACTILE MOTOR-VEHICLE TRAILER HITCH

FIELD OF THE INVENTION

The present invention relates to a motor-vehicle trailer hitch. More particularly this invention concerns such a hitch that can be moved between a use position projecting from the vehicle and a storage position retracted out of sight.

BACKGROUND OF THE INVENTION

A standard retractile motor-vehicle trailer hitch as described in German patent document 198 59 961 of F. Domke et al has a solid shaft bolted to the motor-vehicle frame and on which the inner end of an arm is pivoted. This arm has an outer end equipped with a standard hitch ball. The inner arm end can move angularly on the shaft between a use position with the hitch ball projecting up rearward of the rear bumper of the vehicle and a retracted position hidden behind the vehicle bumper.

In addition the arm inner end can move axially limitedly on the shaft between a locked position and an unlocked position. In the locked position interengaging formations on the frame and on the arm inner end fit together and prevent angular movement of the arm. This locked position can be assumed in both the use and retracted positions of the arm. In the unlocked position the formations are out of engagement with each other so that the arm can pivot freely between its end positions.

The coupling formations are axially interengageable teeth on the frame and on the arm inner end. The arm is moved along the shaft by an actuator fitted externally to an ed of the shaft. Thus the user grips a knob end of this actuator, operates it to unlock the arm, and then pivots the entire arm to move it between its end positions.

Such operation is fairly difficult and cumbersome. The user must typically crouch behind the vehicle and grope under the frame to operate the hitch. Furthermore the hitch is exposed to road dirt so that it is normally filthy, something that not only makes handling it difficult, but that also leads to corrosion and deterioration of the actuating elements.

OBJECTS OF THE INVENTION

It is therefore an object of the present invention to provide an improved retractile motor-vehicle trailer hitch.

Another object is the provision of such an improved retractile motor-vehicle trailer hitch which overcomes the above-given disadvantages, that is which is easy to operate and that is resistant to damage and corrosion.

SUMMARY OF THE INVENTION

A retractile trailer hitch has according to the invention a tube shaft extending along an axis and fixed on a motor-vehicle frame and an arm having a tubular inner end pivotal on the tube shaft and an outer ball end. The arm is pivotal on the tube shaft about the axis between two angularly offset arm end positions, and the arm inner end is limitedly axially displaceable on the tube shaft between a locked position and an unlocked position. Interengageable formations on the frame and on the arm inner end angularly arrest the arm in the arm end positions in the locked position of the arm inner end. The formations are unengageable with each other in the unlocked position of the arm inner end so that the arm can pivot freely between its arm end positions in the unlocked position but is angularly nonmovable on the shaft in the locked position. In accordance with the invention a lock element is axially displaceable inside the tube shaft between a holding position and a freeing position. Balls inside the arm inner end are coupled to the lock element for axially displacing the arm into the locked position on displacement of the lock element into the holding position and for displacing the arm axially into the unlocked position on displacement of the lock element into the freeing position. An actuator connected to the lock element axially displaces the lock element between its holding and freeing positions.

With the lock element housed inside a tube shaft that carries the arm, the critical lock elements are well protected and completely shielded from the outside by the relatively massive structure of the tube shaft and of the arm inner end. Service problems are largely eliminated. What is more, using an axially displaceable lock element makes it possible for the system that angularly locks the arm to also serve to displace it between the use and retracted positions.

According to the invention a spring is braced between the tube shaft and the lock element for urging the lock element into the holding position. The actuator includes a remote operator and a flexible connection between the remote operator and the lock element. Such an actuator is described in German utility model 94 08 478. This makes it possible to retract the trailer hitch from inside the vehicle. Normally the arm is weighted such that if the arm is unlocked when in either of the end positions, it will swing by gravity into an intermediate position from which it can be moved manually or by a motor into the desired end position. In fact a motor or a hydraulic or electric actuator could be used to displace the lock element too.

The means that retains the arm in its end positions includes radially inwardly open seats on the arm inner end in which the balls are receivable and having angled cam edges engageable with the balls to axially displace the arm inner end. The lock element has a tapered outer surface engageable with the balls.

The trailer hitch further has according to the invention a retaining element displaceable between a position blocking axial movement of the lock element and a position permitting axial movement of the lock element and cam formations on the arm end operatively engageable with the retaining element to displace the retaining element into the position permitting axial movement of the lock element only in the arm end positions. Means such as a radially extending screw set in the arm inner end prevents the lock element from rotating about the axis in the tube shaft. More particularly the lock element is formed with a radially extending passage. The arm inner end is formed with a radially extending passage aligned in the arm end positions with the lock-element passage, and the retaining element is a retaining ball radially displaceable in the passages. The retaining element includes a pusher rod radially displaceable in the passage of the arm inner end and engageable with the retaining ball and with the cams.

The formations that arrest the arm on the vehicle frame include balls on the frame and axially open seats on the arm end in which the balls engage in the locked position.

Similarly according to the invention there are first and second sets of the balls in axially offset respective first and second planes. The lock element has axially offset first and second cam formations spaced apart by a distance greater than an axial distance between the planes and engageable with the respective sets of balls. In addition the lock element has a region of reduced diameter between the first and second cam formations. The arm inner end is formed with first and second inwardly open grooves in which the respective sets of balls are engageable in the locked and unlocked positions. The first and second grooves are offset axially from each other by a distance shorter than the axial distance between the planes. Such use of two different sets of balls with their own seat grooves is advantageous in that it ensures positive axial displacement of the arm in both directions so that if it is fouled by road dirt or the like it can still be shifted. One set of balls is responsible for retaining the arm in the locked position, the other in the unlocked position.

The formations that couple the arm end to the vehicle frame include a pin set in the vehicle frame and having a head projecting axially toward the arm inner end and a pair of angularly offset seats in the arm inner end open axially toward the frame. The pin head is receivable in the seats in the arm end positions. The pin head is generally semispherical. In addition the arm inner end is formed between the seats with a track on which the head rides when the arm inner end is between the arm inner positions and which holds the arm inner end in the unlocked position. Thus when the lock element is spring loaded it can be released as soon as the arm moves out of its one end position and the arm will not be locked back in place until it reaches the opposite end position or is returned to the starting end position. Thus during this changeover the balls that serve for locking the arm in place in its end positions will not be loose and rattle in their seats.

The vehicle frame has a pair of parts to one of which the tube shaft is bolted and a spacer is provided between the other of the parts and the tube shaft. A bolt extending through the other of the parts and through the spacer is threaded into an outer end of the tube shaft.

According to further features of the invention the frame on which the tube shaft is mounted is formed by one or two flanges mounted on a transverse frame member, that is one extending horizontally perpendicular to the vehicle direction of travel. This frame member can have several parts and the tube shaft is mounted centrally or even somewhat offset from the center on it. A motor drive can be provided for rotating the arm and axially displacing the bolt, and switches on the frame and on the arm can report on the position of the arm to a central controller. Similarly the arm can carry the electrical hookup for the brake and running lights of the trailer, so that this socket is also hidden out of sight when the hitch is retracted. At least some of the parts of the hitch can be made of light metal.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
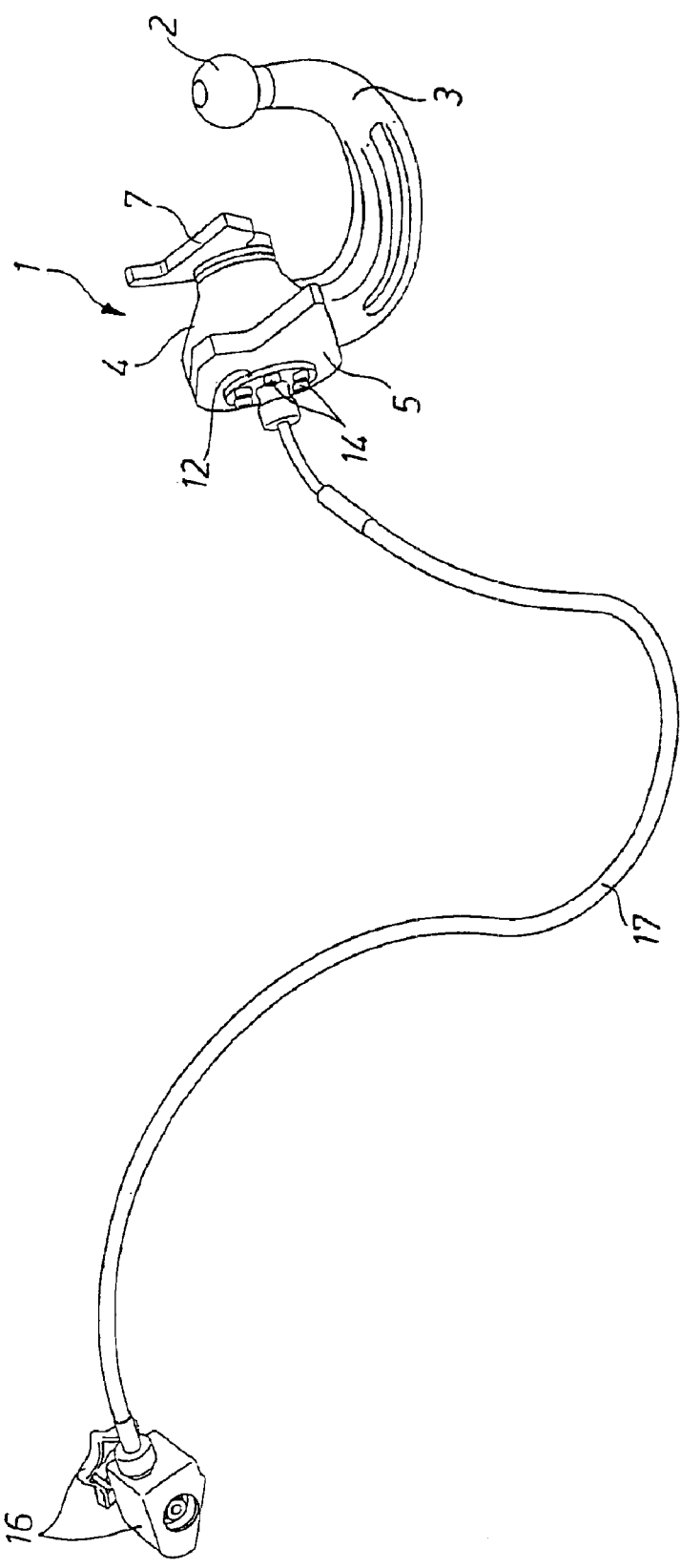
FIG. 1 is a small-scale perspective view of the hitch in accordance with the invention.
Figure 2:
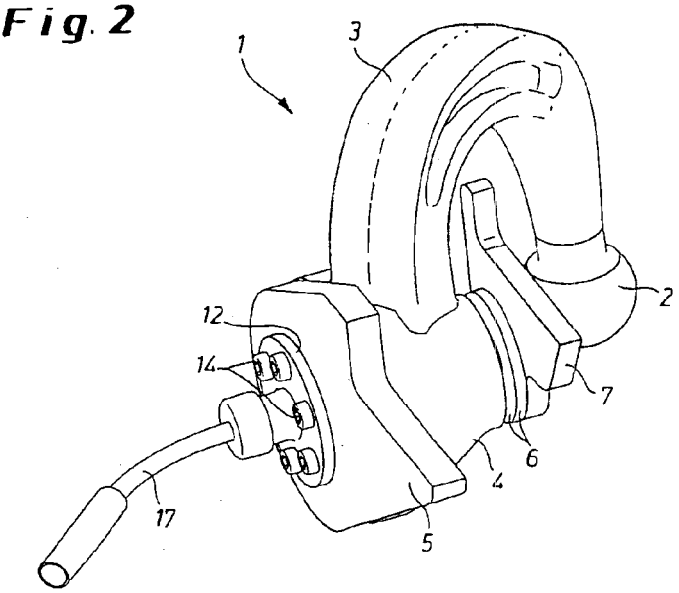
FIG. 2 is perspective view of the hitch in the storage position.
Figure 3:
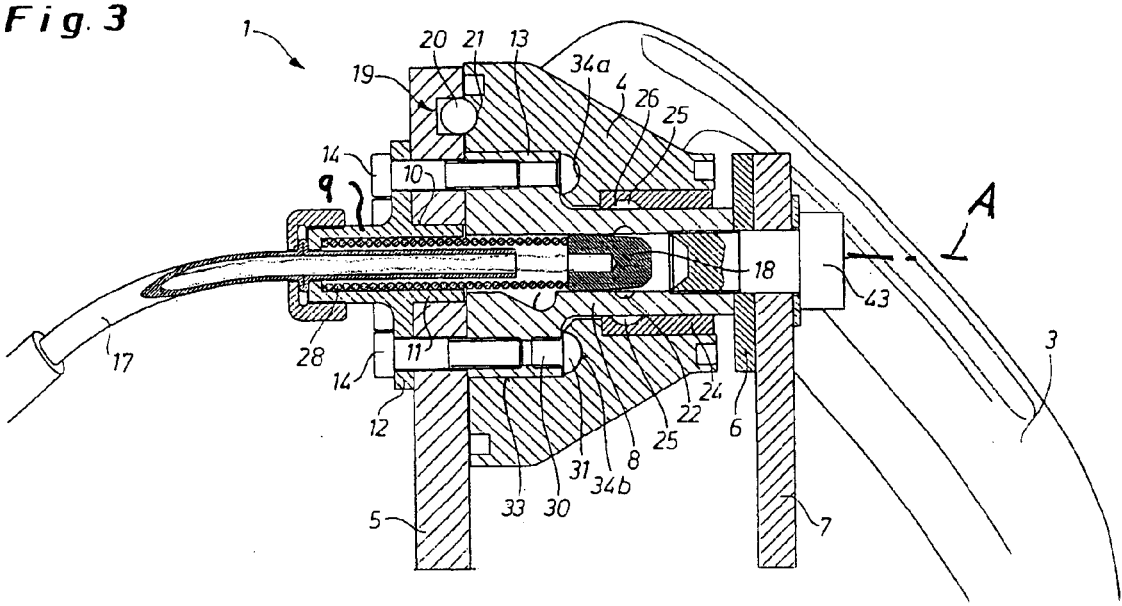
FIG. 3 is a sectional view through the hitch in the locked position.
Figure 4:
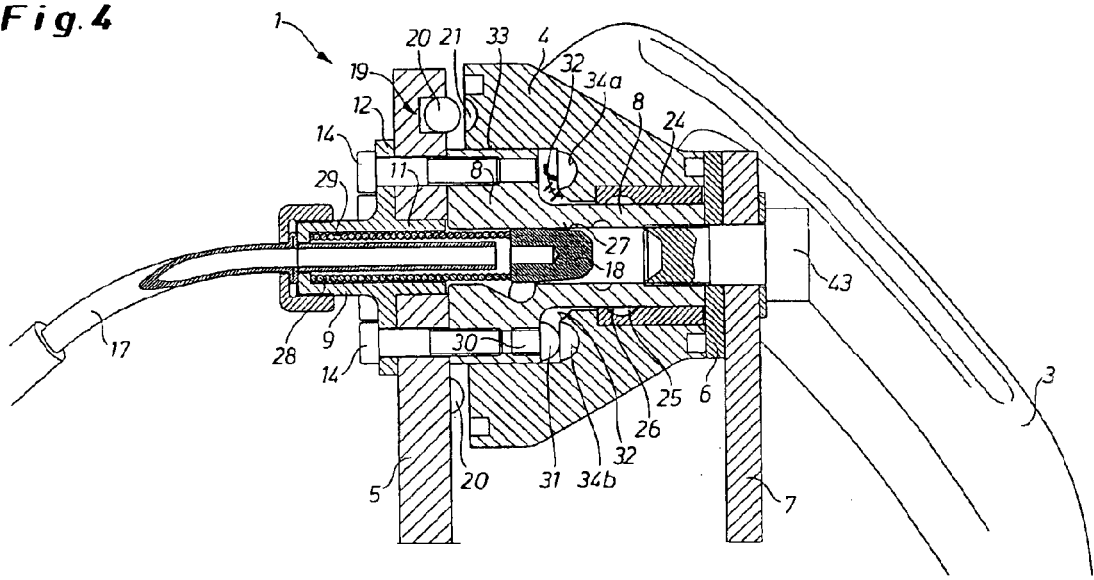
FIG. 4 is a view like FIG. 3 of the hitch in the unlocked position.

As seen in FIGS. 1 to 4, a motor-vehicle trailer hitch 1 according to the invention has a standard hitch ball 2 formed on the outer end of an arcuate arm 3 having a sleeve-like inner end 4 pivoted about an axis A on a tube shaft 8 fixed between plates 5 and 7 of a motor-vehicle frame. Spacer shims 6 are engaged between the inner end 4 and the plate 7 to allow limited movement of the inner end 4 along the axis A as will be described below. In FIG. 1 the hitch 1 is shown in the use position with the ball 2 upraised and outside the unillustrated bumper. In FIG. 2 the hitch 1 is retracted with the ball pointing down and hidden behind the bumper.

The tube shaft 8 is fixed between the spacer shims 6 and the plate 5. Bolts 14 having heads bearing on a flange 12 of a fitting 9 fix the shaft 8 to the plate 5 with a sleeve 11 of the fitting 9 engaged in an axially centered bore 10 of the plate 5 and threaded shanks of the bolts 14 engaged in a flange 13 of the shaft 8. Centering pins 15 (FIGS. 5 and 6) can also be used to lock the flange 13 in place on the plate 5.

A handwheel mechanism 16 (FIG. 1) of the type described in German utility model 94 08 478 is connected via a Bowden cable 17 to a lock element or bolt 18 axially displaceable in the tube shaft 8. This bolt 18 can radially displace balls 23 (see FIG. 5) in radial bores 22 of the shaft 8 between outer positions engaged in radially inwardly open seats 25 formed in a sleeve 24 fitted to the arm end 4 and inner positions clear of these seats 25. When the balls 23 are fitted to the seats 25, the inner arm end 4 is forced into an end position close to the plate 5 where a coupling mechanism 19 angularly fixes the arm 3 relative to the plate 5. To this end the seats 25 have beveled cam edges 26 that, when engaged by the balls 23, force the arm inner end 4 axially inward (to the left in FIG. 3). The bolt 18 in turn has a self-locking frustoconically tapered outer surface 27 so that, when moved outward, it can fit between the balls 23 and push them outward. The coupling mechanism 19 in turn is comprised of a plurality of balls 20 seated in the plate 5 and engageable in axially open seats 21 formed in the confronting face of the arm end 4. A spring 28 fitted to an annular compartment 29 of the fitting 9 urges the bolt 18 axially outward (to the right in FIG. 3), into the position pressing the balls 23 outward. An abutment bolt 30 set in the tube shaft 8 has a semispherical head 31 engageable in seats 34a and 34b at opposite ends of a track formed in the inner face of the end 4 so that in each of its angular end positions this bolt 30 further serves to angularly arrest the arm 2.

Thus the arm 3 can be released to move between its end positions by operation of the actuator 16 to pull back the bolt 18 axially inward. This action allows the balls 23 to move inward out of the seats 25, thereby axially decoupling the arm end 4 from the tube shaft 8. Presuming the arm 3 is in the use position of FIG. 1, its weight will be effective to cam the arm end 4 axially outward so that the seats 21 will separate from the balls 20 and the seat 34a from the pin 30. Once the arm end 4 has pivoted enough to misalign the pin heads 31 with the seat 34a, an end surface 32 of an inner surface 33 of the arm end 4 will ride on the bolt heads 31 and hold the arm end 4 in the unlocked position until the head 31 is aligned with the other seat 34b.

Presuming that the actuator 16 has released the bolt 18 once the arm 3 has pivoted enough to move the head 31 out of the seat 34a. Once the arm 3 reaches the opposite end position the force of the spring 28 urging the bolt 18 outward will push the balls 23 outward to urge the arm 3 axially inward so that, once the head 31 is aligned with the other seat 34b, the arm 3 will shift axially inward and the balls 20 will lock it in place again.

In the position with the head 31 aligned with either of the seats 34a or 34b, the balls 20 are aligned with the seats 21 so that, when the inner face of the arm end 4 again abuts the outer face of the plate 5, these balls 20 fit to the seats 21 and solidly angularly lock the arm 3 on the plates 5 and 7.

Figure 5:
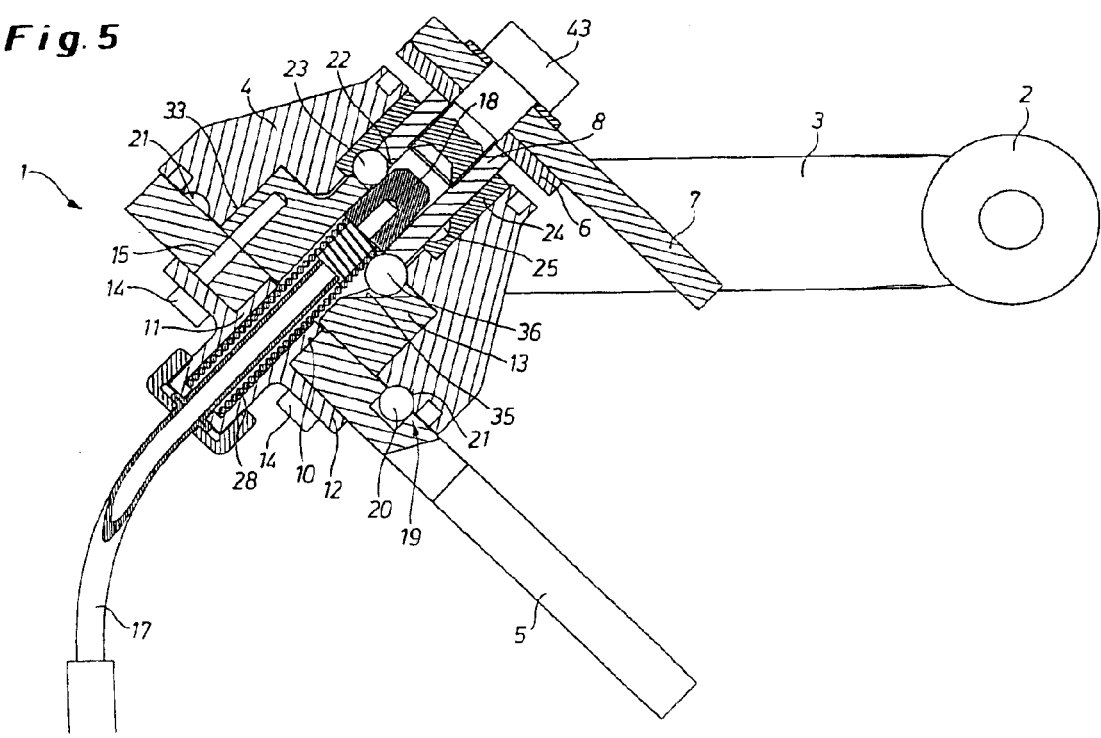
FIG. 5 is a view like FIG. 3 of a second hitch according to the invention in the locked position.
Figure 6:
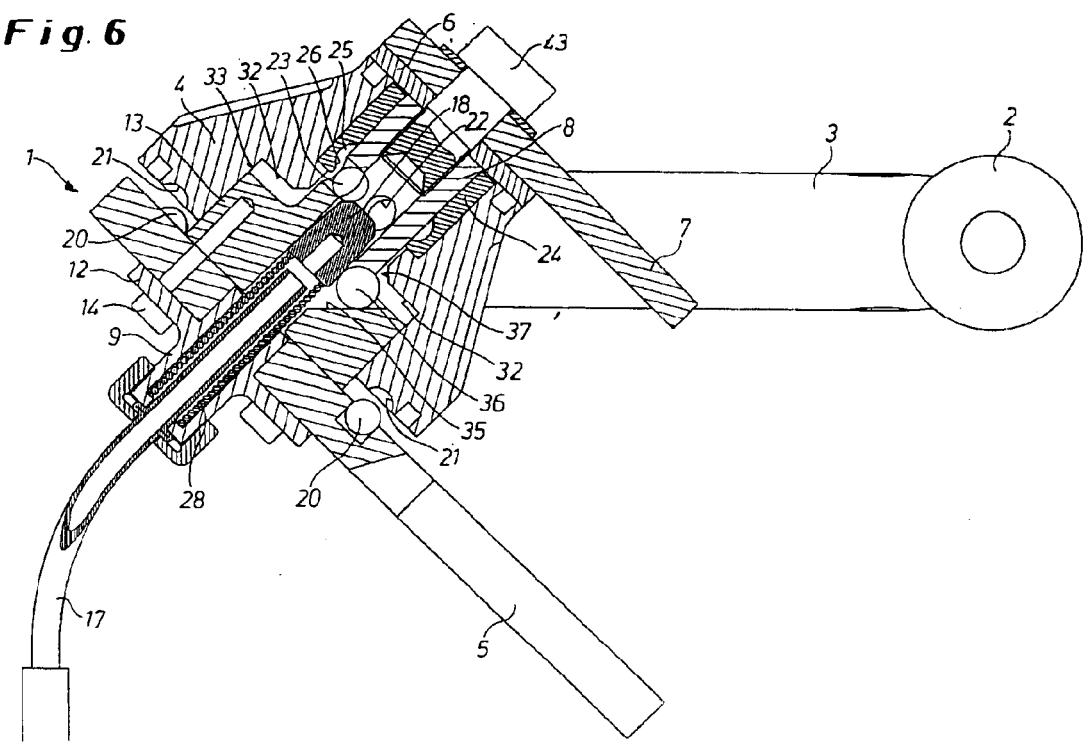
FIG. 6 is a view of the FIG. 5 hitch in the unlocked position.

The system of FIGS. 5 and 6 has a diagonal groove 35 in which rides another ball 36 that is engaged by the bolt 18 when it is pulled back, that is downward and to the left in the drawing. The ball 36 also bears against a frustoconical end surface 37 of the arm end 4. In the locked position, the ball 36 is displaced radially inward and the arm end 4 sits flatly against the plate 5. When the bolt 18 is retracted into the freeing position, that is pulled axially inward, it pushes the ball 36 radially outward to press it down between the floor of the groove 35 and the angled face 37, thereby pushing the arm end 4 axially outward. Here the plate 7 is fitted with a bolt 43 that projects into the end of the tube shaft 8 and serves as an end stop for the bolt 18. If the plate 7 were not provided, the bolt 43 could be replaced by a simple plug inserted into the shaft 8 which would, in that case, be mounted solely in the plate 5.

Figure 7:
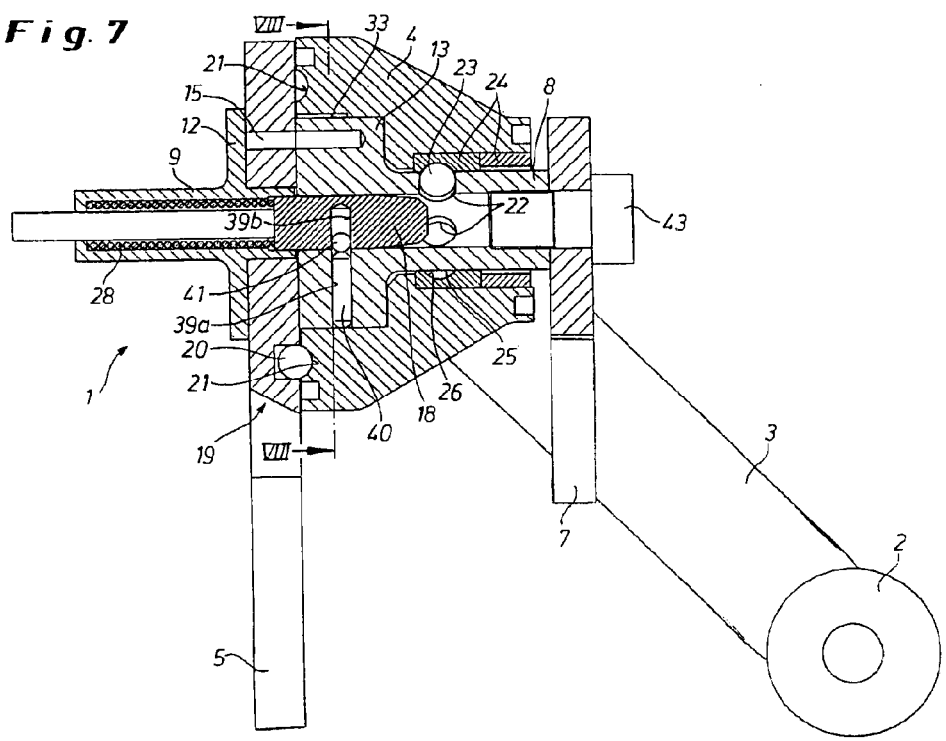
FIG. 7 is a view like FIG. 5 of a third hitch in accordance with the invention.
Figure 8:
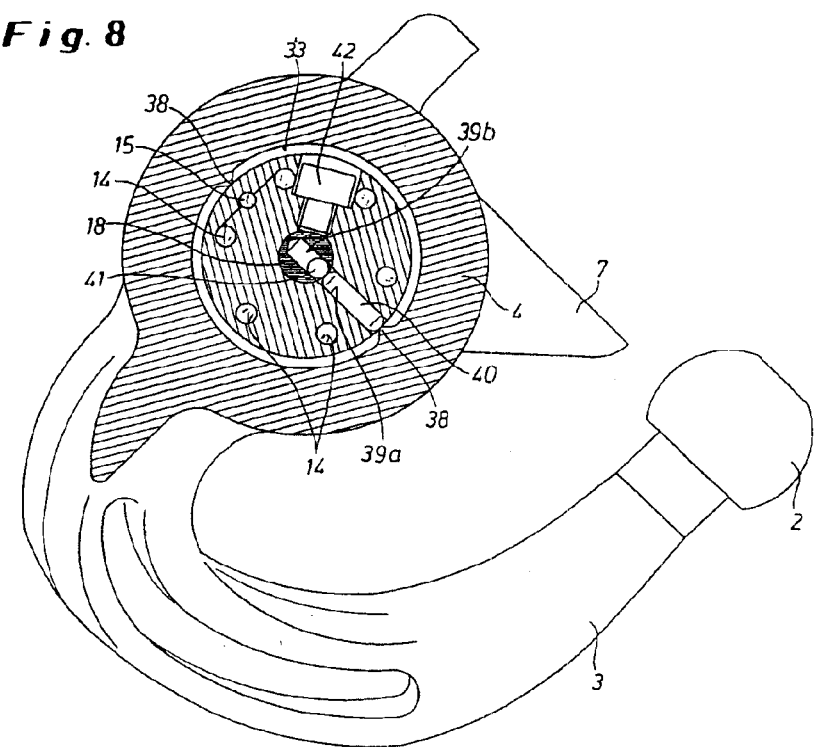
FIG. 8 is a section taken along line VIII—VIII of FIG. 7.

In FIGS. 7 and 8 the radially inwardly directed surface 33 of the arm end 4 is formed with cam formations or bumps 38 that can in each of the 180° offset end positions radially displace a coupling pin 40 in a bore 39a of the sleeve 8. A ball 41 in a radially extending blind bore 39b of the bolt 18 normally prevents the bolt 18 from moving axially. When pushed inward, the pin 40 can push in the ball 41 and free the bolt 18 to move axially. A bolt 42 engaging a flat of the bolt 18 prevents it from rotating while allowing it to shift axially and thus allows alignment of the bores 39a and 39b in the end positions of the arm 3. Thus the bolt 18 is prevented from moving axially except in the end positions of the arm 2.

Figure 9:
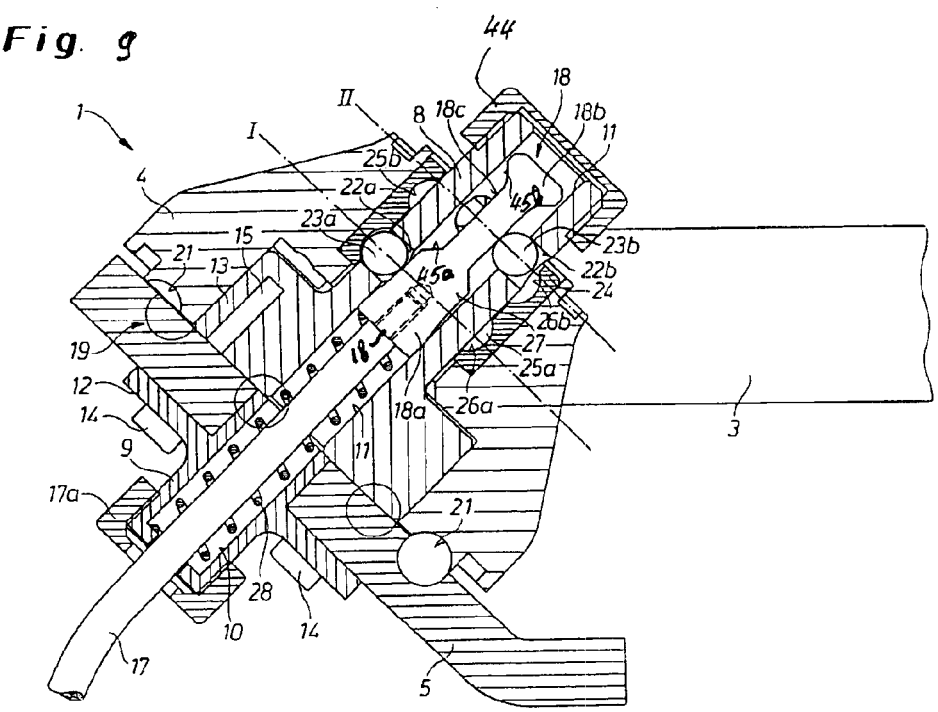
FIG. 9 is a view like FIG. 3 through a fourth hitch according to the invention in the locked position.
Figure 10:
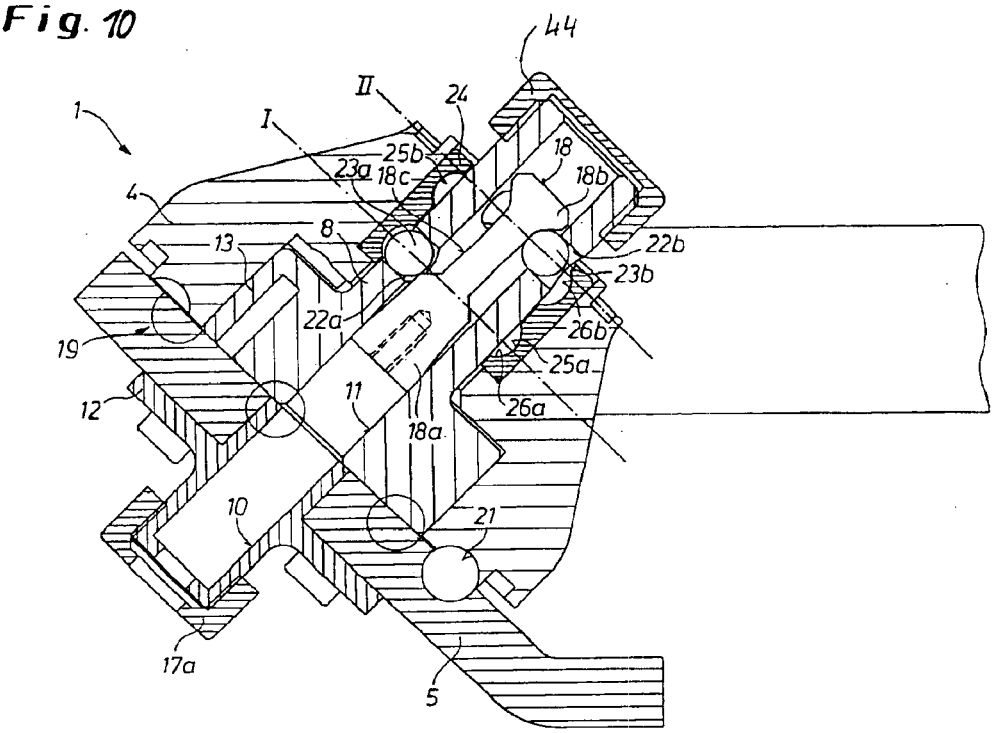
FIG. 10 is a view of the FIG. 9 hitch partially unlocked.
Figure 11:
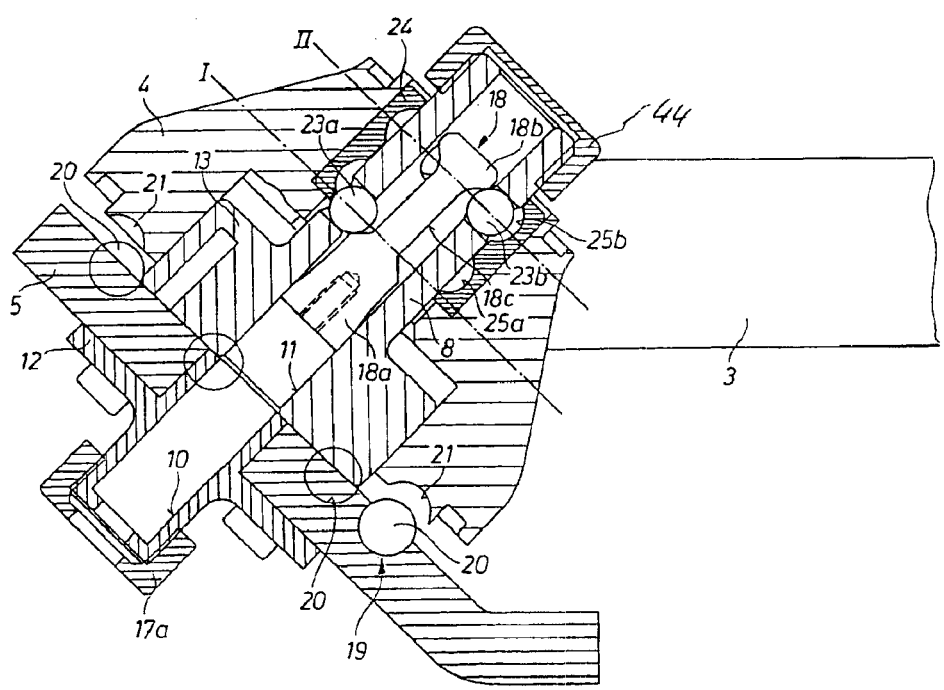
FIG. 11 is a view of the FIG. 9 hitch fully unlocked.

The system of FIGS. 9 to 11 an inner set of radially throughgoing guide holes 22a in an inner plane I and an outer set of radially throughgoing guide holes 22b in an outer plane II hold respective balls 23a and 23b engageable in respective inwardly open part-circular-section grooves 25a and 25b of the liner sleeve 24. The axial spacing between the planes I and II is greater than that between the seat grooves 25a and 25b so that at any time only one of the other set of balls 23a or 23b can be engaged in the respective seat groove 25a or 25b. The seat grooves 25a and 25b have cam edges 26a and 26b that function to displace the arm end 4 axially as the balls 23a and 23b are forced radially outward.

The bolt 18 here has an inner part 18a and an outer part 18b separated by a reduced-diameter region 18c with confronting frustoconical cam surfaces 45a and 44b joining it to the parts 18a and 18b. The axial spacing between the inner ends of the surfaces 45a and 45b is equal to that between the planes I and II.

Thus in the locked position shown in FIG. 9 the inner part 18a is engaged with the balls 23a to force them out into the seats 25a and lock the arm end 4 against the plate 5 and the outer balls 23b are able to move into the region of the surface 18c and thereby disengage from the seats 25b. The arm 2 is locked on the plate 5.

When the bolt 18 is retracted it first moves as shown in FIG. 10 into a position with the balls 22a at the very top of the inner cam surface 45a and the balls 22b ant the bottom of the outer cam surface 45b. Further inward movement of the bolt 18 allows the balls 23a to drop inward out of the seats 25a while camming the balls 23b out against the cam edges 26b and, as the arm end 4 is cammed axially outward, into the outer seat groove 25b. With this system, therefore, the inner balls 22a hold the arm end in the locked position and the outer balls 22b hold it in the unlocked position.

Here there is no outer plate 7 and instead the end of the tube shaft 8 is fitted with a threaded cap 44 to protect the latch mechanism inside it.

We claim:

1. A retractile trailer hitch comprising:

a tube shaft extending along an axis and fixed on a motor-vehicle frame;

an arm having a tubular inner end pivotal on the tube shaft and an outer ball end, the arm being pivotal on the tube shaft about the axis between two angularly offset arm end positions, the arm inner end being limitedly axially displaceable on the tube shaft between a locked position and an unlocked position;

interengageable formations on the frame and on the arm inner end for angularly arresting the arm in the arm end positions in the locked position of the arm inner end, the formations being unengageable with each other in the unlocked position of the arm inner end, whereby the arm can pivot freely between its arm end positions in the unlocked position but is angularly nonmovable on the shaft in the locked position;

a lock element axially displaceable inside the tube shaft between a holding position and a freeing position;

means including balls inside the arm inner end coupled to the lock element for axially displacing the arm into the locked position on displacement of the lock element into the holding position and for displacing the arm axially into the unlocked position on displacement of the lock element into the freeing position; and an actuator connected to the lock element for axially displacing the lock element between its holding and freeing positions.

2. The retractile motor-vehicle trailer hitch defined in claim 1, further comprising a spring braced between the tube shaft and the lock element for urging the lock element into the holding position.

3. The retractile motor-vehicle trailer hitch defined in claim 2 wherein the actuator includes a remote operator and a flexible connection between the remote operator and the lock element.

4. The retractile motor-vehicle trailer hitch defined in claim 1 wherein the means includes radially inwardly open seats on the arm inner end in which the balls are receivable and having angled cam edges engageable with the balls to axially displace the arm inner end.

5. The retractile motor-vehicle trailer hitch defined in claim 4 wherein the lock element has a tapered outer surface engageable with the balls.

6. The retractile motor-vehicle trailer hitch defined in claim 1, further comprising a retaining element displaceable between a position blocking axial movement of the lock element and a position permitting axial movement of the lock element; and cam formations on the arm end operatively engageable with the retaining element to displace the retaining element into the position permitting axial movement of the lock element only in the arm end positions.

7. The retractile motor-vehicle trailer hitch defined in claim 6, further comprising means for preventing the lock element from rotating about the axis in the tube shaft.

8. The retractile motor-vehicle trailer hitch defined in claim 6 wherein the lock element is formed with a radially extending passage, the arm inner end is formed with a radially extending passage aligned in the arm end positions with the lock-element passage, and the retaining element is a retaining ball radially displaceable in the passages.

9. The retractile motor-vehicle trailer hitch defined in claim 8 wherein the retaining element includes a pusher rod radially displaceable in the passage of the arm inner end and engageable with the retaining ball and with the cams.

10. The retractile motor-vehicle trailer hitch defined in claim 1 wherein the formations include balls on the frame and axially open seats on the arm end in which the balls engage in the locked position.

11. The retractile motor-vehicle trailer hitch defined in claim 1 wherein there are first and second sets of the balls in axially offset respective first and second planes, the lock element having axially offset first and second cam formations spaced apart by a distance greater than an axial distance between the planes and engageable with the respective sets of balls.

12. The retractile motor-vehicle trailer hitch defined in claim 11 wherein the lock element has a region of reduced diameter between the first and second cam formations.

13. The retractile motor-vehicle trailer hitch defined in claim 11 wherein the arm inner end is formed with first and second inwardly open grooves in which the respective sets of balls are engageable in the locked and unlocked positions, the first and second grooves being offset axially from each other by a distance shorter than the axial distance between the planes.

14. The retractile motor-vehicle trailer hitch defined in claim 1, wherein the formations include a pin set in the vehicle frame and having a head projecting axially toward the arm inner end, and a pair of angularly offset seats in the arm inner end open axially toward the frame, the pin head being receivable in the seats in the arm end positions.

15. The retractile motor-vehicle trailer hitch defined in claim 14 wherein the pin head is generally semispherical.

16. The retractile motor-vehicle trailer hitch defined in claim 14 wherein the arm inner end is formed between the seats with a track on which the head rides when the arm inner end is between the arm inner positions and which holds the arm inner end in the unlocked position.

17. The retractile motor-vehicle trailer hitch defined in claim 1 wherein the frame has a pair of parts to one of which the tube shaft is bolted, the hitch further comprising a spacer between the other of the parts and the tube shaft; and a bolt extending through the other of the parts and through the spacer and threaded into an outer end of the tube shaft.

18. The retractile motor-vehicle trailer hitch defined in claim 1 wherein the tube shaft and arm inner end are formed with confronting angled cam surfaces, the means including a pusher ball engaging both of the surfaces and engageable with the lock element such that on axial displacement of the lock element the pusher ball forces the cam surfaces apart and moves the arm inner end into the unlocked position.

19. The retractile motor-vehicle trailer hitch defined in claim 18 wherein the cam surface of the tube shaft is formed by an inwardly open groove holding the pusher ball, the cam surface of the arm inner end being frustoconical and centered on the axis.

20. The retractile motor-vehicle trailer hitch defined in claim 1 wherein the lock element is an axially displaceable bolt.

* * * * *